United States Patent
Ning et al.

(10) Patent No.: US 10,241,772 B1
(45) Date of Patent: Mar. 26, 2019

(54) RECOMMENDING SUBSTITUTE APPLICATIONS

(71) Applicant: Google Inc., Mountain View, CA (US)

(72) Inventors: Huazhong Ning, San Jose, CA (US); Haichun Chen, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 100 days.

(21) Appl. No.: 15/204,740

(22) Filed: Jul. 7, 2016

(51) Int. Cl.
| *G06F 9/445* | (2018.01) |
| *G06F 8/61* | (2018.01) |
| *G06Q 50/00* | (2012.01) |
| *G06F 17/30* | (2006.01) |
| *G06F 3/0484* | (2013.01) |

(52) U.S. Cl.
CPC .............. *G06F 8/61* (2013.01); *G06F 3/0484* (2013.01); *G06F 17/3053* (2013.01); *G06Q 50/01* (2013.01)

(58) Field of Classification Search
None
See application file for complete search history.

(56) References Cited

U.S. PATENT DOCUMENTS

| 8,516,308 B1 | 8/2013 | Gill et al. |
| 8,560,489 B2 | 10/2013 | Kaufman |
| 8,914,399 B1 | 12/2014 | Paleja et al. |
| 9,021,429 B1 | 4/2015 | Agrawal et al. |
| 9,063,811 B2 * | 6/2015 | Stekkelpak ......... G06F 9/44505 |
| 9,098,370 B2 | 8/2015 | MacDonald |
| 9,223,831 B2 | 12/2015 | Baker et al. |
| 2005/0246211 A1 * | 11/2005 | Kaiser ................ G06Q 10/0639 |
| | | 705/7.29 |

(Continued)

FOREIGN PATENT DOCUMENTS

WO     2016099447 A1    6/2016

OTHER PUBLICATIONS

Linden, Greg, et al. "Amazon.com Recommendations Item-to-Item Collaborative Filtering." UMD.edu, Jan. 2003, www.cs.umd.edu/~samir/498/Amazon-Recommendations.pdf. Accessed Jan. 4, 2018.*

(Continued)

*Primary Examiner* — Wei Y Zhen
*Assistant Examiner* — Binh K Luu
(74) *Attorney, Agent, or Firm* — Shumaker & Sieffert, P.A.

(57) ABSTRACT

A method is described that includes comprising receiving, by a first computing device and from a second computing device, an indication of user interaction with a first application. The method also includes determining, by the first computing device and based on the user interaction with the first application, a user engagement score associated with the first application, the user engagement score indicating at least one of how frequently or how long the user uses the first application. The method also includes responsive to determining that the user engagement score does not satisfy a threshold user engagement score, determining, by the first computing device and from a set of applications that are alternatives to the first application, a second application to substitute for the first application. The method further includes sending, by the first computing device and to the second computing device, for display, an indication of the second application.

15 Claims, 6 Drawing Sheets

(56) References Cited

U.S. PATENT DOCUMENTS

| | | | |
|---|---|---|---|
| 2007/0150361 A1* | 6/2007 | Kreiner | G06Q 30/06 705/80 |
| 2008/0059416 A1* | 3/2008 | Forbes | G06Q 10/10 |
| 2009/0171680 A1* | 7/2009 | Wiesinger | G06Q 30/02 705/346 |
| 2011/0320307 A1* | 12/2011 | Mehta | G06Q 30/0282 705/26.7 |
| 2013/0085886 A1 | 4/2013 | Satish et al. | |
| 2013/0145360 A1 | 6/2013 | Ricci | |
| 2013/0198029 A1* | 8/2013 | Mowatt | G06Q 10/10 705/26.7 |
| 2013/0304608 A1 | 11/2013 | Mehta et al. | |
| 2013/0326499 A1* | 12/2013 | Mowatt | G06F 8/60 717/177 |
| 2013/0339284 A1 | 12/2013 | Rowles et al. | |
| 2014/0237361 A1* | 8/2014 | Martin | G11B 27/105 715/716 |
| 2015/0088955 A1 | 3/2015 | Hendrick et al. | |
| 2015/0112831 A1 | 4/2015 | Jackson et al. | |
| 2015/0169759 A1 | 6/2015 | Ronen et al. | |
| 2015/0346961 A1* | 12/2015 | Cui | G06F 9/445 715/838 |
| 2015/0363289 A1 | 12/2015 | Brough | |
| 2016/0035230 A1* | 2/2016 | Spaulding | G09B 5/02 434/236 |
| 2016/0154641 A1 | 6/2016 | Kirkham et al. | |
| 2016/0162270 A1* | 6/2016 | Kumar | G06F 8/61 717/177 |
| 2016/0294961 A1* | 10/2016 | Cordes | H04L 67/22 |
| 2017/0116552 A1* | 4/2017 | Deodhar | G06Q 10/06316 |
| 2017/0345074 A1* | 11/2017 | Wadley | G06Q 30/0613 |
| 2017/0351388 A1* | 12/2017 | Grunewald | H04W 8/22 |
| 2017/0351978 A1* | 12/2017 | Bellowe | G06Q 10/02 |

OTHER PUBLICATIONS

Cheng et al, "Wide & Deep Learning for Recommender Systems", Deep Learning for Recommender Systems, Sep. 15, 2016, 4 pages.

Yan et al., "AppJoy: Personalized Mobile Application Discovery", Department of Computer Science, University of Massachusetts Lowell, Jun. 28, 2011, pp. 113-126.

* cited by examiner

RECOMMENDING SUBSTITUTE APPLICATIONS

BACKGROUND

Some computing devices (e.g., mobile phones, tablet computers, computerized watches, etc.) allow users to install applications from an application repository or other type of digital distribution platform for delivering computing software to computing devices. In some examples, a computing device may present a graphical user interface (GUI) of an application repository from which a user can provide inputs to browse or search for a software application that is available for installation on one or more devices. Through many interactions with the GUI overtime, a user can easily cause a computing device to install many applications.

Once installed, however, many applications are not used very often beyond a user's initial interactions with the application. For instance, an application may not be used frequently if the application has limited functionality or is difficult to use. An application that is installed on the computing device and is used infrequently may nevertheless utilize the resources of the computing device (e.g., non-volatile memory, volatile memory, processor time, etc.), which may reduce the performance of the computing device.

SUMMARY

In one example, the disclosure describes a method comprising: receiving, by a first computing device and from a second computing device, an indication of user interaction with a first application; determining, by the first computing device and based on the user interaction with the first application, a user engagement score associated with the first application, the user engagement score indicating at least one of how frequently or how long the user uses the first application; responsive to determining that the user engagement score does not satisfy a threshold user engagement score, determining, by the first computing device and from a set of applications that are alternatives to the first application, a second application to substitute for the first application; and sending, by the first computing device and to the second computing device, for display, an indication of the second application.

In another example, the disclosure describes a first computing device comprising: at least one processor and a memory. The memory comprises instructions that, when executed by the at least one processor, cause the at least one processor to: receive, from a second computing device, an indication of user interaction with a first application; determine, based on the user interaction with the first application, a user engagement score associated with the first application, the user engagement score indicating at least one of how frequently or how long the user uses the first application; responsive to determining that the user engagement score does not satisfy a threshold user engagement score, determine, from a set of applications that are alternatives to the first application, a second application to substitute for the first application; and send, to the second computing device, for display, an indication of the second application.

In another example, the disclosure describes a computer-readable storage medium encoded with instructions that, when executed by at least one processor of a computing device, cause the at least one processor to: receive an indication of user interaction with a first application installed at a memory of the computing device; determine, based on the user interaction with the first application, a user engagement score associated with the first application, the user engagement score indicating at least one of how frequently or how long the user uses the first application; responsive to determining that the user engagement score does not satisfy a threshold user engagement score, determine, from a set of applications that are alternatives to the first application, a second application to substitute for the first application; and output, for display at a display device, a graphical user interface indicative of the second application.

The details of one or more examples are set forth in the accompanying drawings and the description below. Other features, objects, and advantages of the disclosure will be apparent from the description and drawings, and from the claims.

DETAILED DESCRIPTION

Figure 1:
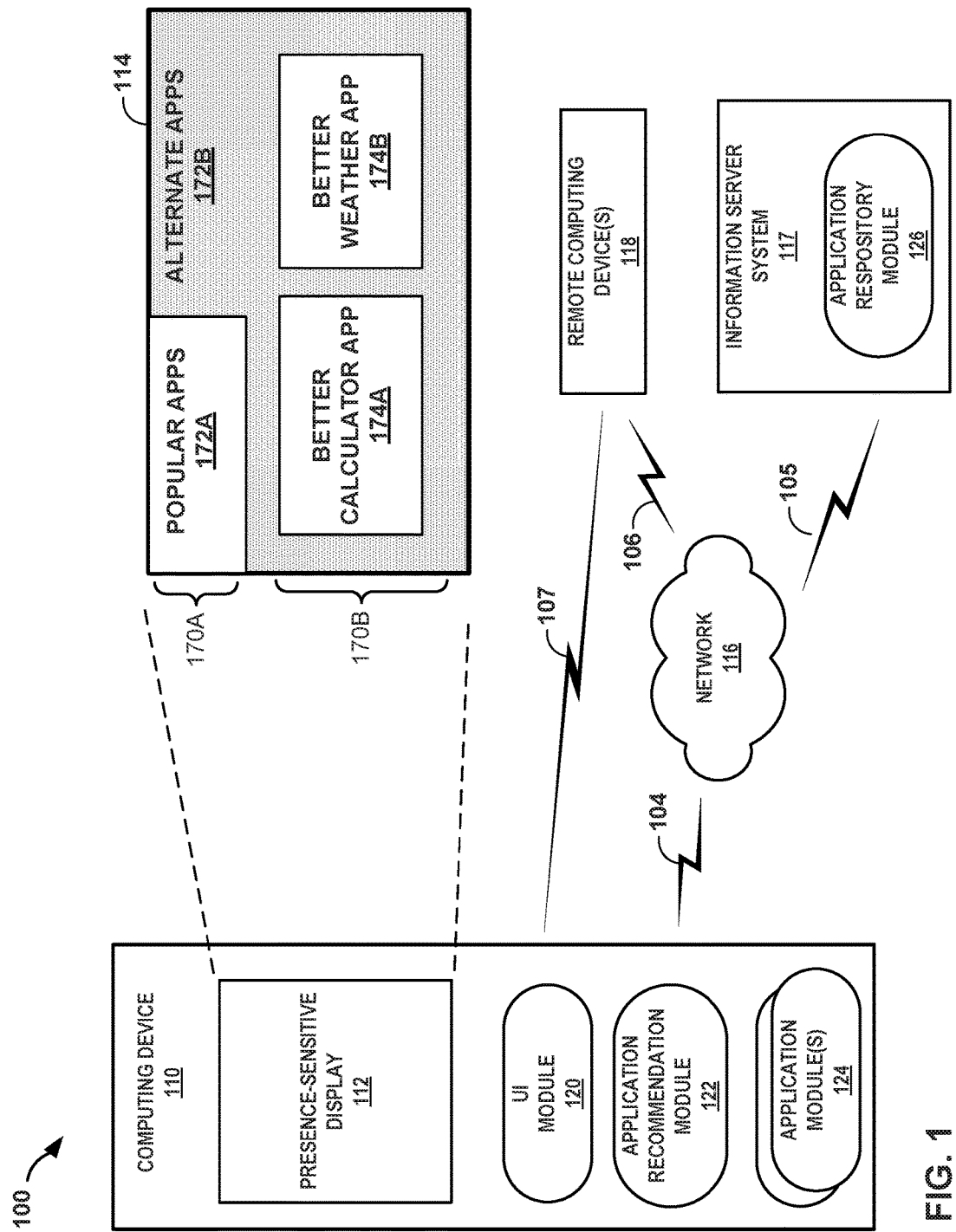
FIG. 1 is a conceptual diagram illustrating an example system for presenting a graphical user interface representing an alternative application, in accordance with one or more aspects of the present disclosure.

In general, this disclosure is directed to techniques for enabling a computing device to determine whether a user is satisfied with a particular application ("app") installed at the computing device or installed at a different computing device, and if not, to recommend an alternate application as a substitute for the particular application. For example, based in part on user interactions with a particular application (or lack thereof), the computing device may determine a user engagement score associated with the particular application, which may indicate how frequently or for how long a user uses the particular application. If the user engagement score satisfies a threshold user engagement score, the computing device may infer that the user is satisfied with the particular application and that the computing device should not recommend an alternate to the particular application. However, if the user engagement score does not satisfy the threshold user engagement score, this the computing device may infer that the user is not satisfied with the particular application and that the particular application is wasting system resources that could be better utilized by a different application that might be more likely to obtain a higher user engagement score. Thus, the computing device may identify a set of applications that are alternatives to the particular application and select one or more alternative applications that are more likely to obtain more frequent and/or longer duration user interactions than the particular application. After selecting the one or more alternate application, the computing device may output an indication of the alternate applications (e.g., by causing a graphical indication of the alternate application to be displayed within a graphical user interface of a digital distribution platform, as a notification, etc.).

In this way, the techniques described in this disclosure may enable a computing device to identify installed applications that have low levels of user engagement and to predict alternate applications that are more likely to obtain higher levels of user engagement. By predicting applications that are more likely obtain higher engagement scores, the computing device may reduce the number of unused applications that are installed at the computing device. Reducing the number of applications installed at the computing device may reduce the amount of system resources (e.g., memory, processing power, etc.) consumed by unused applications and increase performance of the computing device. In addition, by automatically recommending alternate applications that are more likely to be of interest to a user, the computing device may perform fewer operations executing searches for, and installing, new applications that may likely go unused, thereby reducing the amount of electrical power consumed by the computing device.

Throughout the disclosure, examples are described in which a computing device and/or a computing system may analyze information (e.g., application usage) associated with a computing device only if the computing device receives permission from the user to analyze the information. For example, the user may be provided with an opportunity to provide input to control whether the computing device can collect and make use of user information (e.g., whether a user interacts with an application, information about the frequency and/or duration of user interaction with an application, etc.), or to dictate whether and/or how to the computing device may receive content that may be relevant to the user. In addition, certain data may be treated in one or more ways before it is stored or used by the computing device and/or computing system, so that personally identifiable information is removed. For example, a user's identity may be treated so that no personally identifiable information can be determined about the user. Thus, the user may have control over how information is collected about the user and used by the computing device.

FIG. 1 is a conceptual diagram illustrating an example system for presenting a graphical user interface representing an alternative application, in accordance with one or more aspects of the present disclosure. System 100 may include computing device 110, information server system (ISS) 117, and one or more remote computing device 118 that are communicatively coupled via network 116.

Remote computing devices 118 are one example of a computing device, such as a smartphone, a computerized wearable device (e.g., a watch, eyewear, ring, necklace, etc.), speaker, television, automobile, or any other type of computing device configured to send and receive information via a network, such as network 116. Remote computing device 118 may include one or more applications such as media applications (e.g., music, video, or the like), messaging applications (e.g., email, text, or the like), or any other type of application. Remote computing device 118 may exchange information with computing device 110 via network 116. For example, remote computing device 118 may send information to computing device 110 and may receive information from computing device 110. Remote computing device 118 may also exchange information with computing device 110 without traversing network 116, for example, using direct link 107. Direct link 107 may be any communication protocol or mechanism capable of enabling two computing devices to communicate directly (i.e., without requiring a network switch, hub, or other intermediary network device), such as Bluetooth®, Wi-Fi Direct®, near-field communication, etc.

Network 116 represents any public or private communications network, for instance, cellular, Wi-Fi, and/or other types of networks, for transmitting data between computing systems, servers, and computing devices. Network 116 may include one or more network hubs, network switches, network routers, or any other network equipment, that are operatively inter-coupled thereby providing for the exchange of information between computing device 110, ISS 117, and remote computing devices 118. Computing device 110, ISS 117, and remote computing devices 118 may transmit and receive data across network 116 using any suitable communication techniques. For example, ISS 117 may exchange data with computing device 110 via a cellular network and computing device 110 may exchange data with remote computing device 118 via Wi-Fi.

Computing device 110, ISS 117, and remote computing device 118 may each be operatively coupled to network 116 using respective network links 104, 105, and 106. Computing device 110, ISS 117, and remote computing device 118 may be operatively coupled to network 116 using a different network link. The links coupling computing device 110, ISS 117, and remote computing device 118 to network 116 may be Ethernet, ATM or other types of network connections, and such connections may be wireless and/or wired connections.

ISS 117 represents any suitable remote computing system, such as one or more desktop computers, laptop computers, mainframes, servers, cloud computing systems, etc. capable of sending and receiving information both to and from a network, such as network 116. ISS 117 may host applications and data for contextual information, music, weather information, traffic information, messaging information (e.g., email, text messages), calendar information, social media, news information, etc. ISS 117 may represent a cloud computing system that provides information through network 116 computing device 110, which may output at least a portion of the information provided by ISS 117 to a user.

In some examples, ISS 117 may include application repository module 126. Application repository module 126 may provide a digital distribution platform related to computing software and provide access to a plurality of applications and information associated with each respective application of the plurality of applications. For example, application repository module 126 may enable a user of computing device 110 to browse, search, select, purchase, download, and/or install one or more applications from application repository module 126. In some examples, application repository module 126 may include information about each application, such as a description of each application and/or user comments and reviews of each application. Application repository module 126 may send information about one or more applications of the plurality of applications to computing device 110 so that computing device 110 may display the information to a user of the computing device 110.

Computing device 110 may represent a mobile device, such as a smart phone, a tablet computer, a laptop computer, computerized watch, computerized eyewear, computerized gloves, or any other type of portable computing device. Additional examples of computing device 110 include other mobile and non-mobile devices, such as desktop computers, televisions, personal digital assistants (PDA), portable and non-portable gaming systems, digital media players or micro-consoles, e-book readers, mobile television platforms, automobile navigation and entertainment systems, vehicle cockpit displays, or any other types of wearable and non-wearable, mobile or non-mobile computing devices that may access a digital distribution platform for downloading executable software applications that execute at computing device 110.

Computing device 110 includes a presence-sensitive display (PSD) 112, user interface (UI) module 120, application recommendation module 122, and one or more application modules 124. Modules 120, 122, and 124 may perform operations described using software, hardware, firmware, or a mixture of hardware, software, and firmware residing in and/or executing at computing device 110. Computing device 110 may execute modules 120, 122, and 124 with multiple processors or multiple devices. Computing device 110 may execute modules 120, 122, and 124 as virtual machines executing on underlying hardware. Modules 120, 122, and 124 may execute as one or more services of an operating system or computing platform. Modules 120, 122, and 124 may execute as one or more executable programs at an application layer of a computing platform.

PSD 112 of computing device 110 may function as respective input and/or output devices for computing device 110. PSD 112 may be implemented using various technologies. For instance, PSD 112 may function as input devices using presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology. PSD 112 may also function as output (e.g., display) devices using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing device 110.

PSD 112 may receive tactile input from a user of respective computing device 110. PSD 112 may receive indications of tactile input by detecting one or more gestures from a user (e.g., the user touching or pointing to one or more locations of PSD 112 with a finger or a stylus pen). PSD 112 may output information to a user as a user interface (e.g., user interface 114, which may be associated with functionality provided by computing device 110. For example, PSD 112 may present various user interfaces related to an application store or other features of computing platforms, operating systems, applications, and/or services executing at or accessible from computing device 110.

Application modules 124 represent all the various individual applications and services that may be executing at computing device 110 at any given time. A user of computing device 110 may interact with an interface (e.g., graphical user interface 114) associated with one or more application modules 124 to cause computing device 110 to perform a function. Numerous examples of application modules 124 may exist and include, a mapping or navigation application, a calendar application, a personal assistant or prediction engine, a search application, a transportation service application (e.g., a bus or train tracking application), a social media application, a game application, an e-mail application, a messaging application, an Internet browser application, or any and all other applications that may execute at computing device 110. In some examples, one or more application modules 124 may be installed at computing device 110 during production, testing, or otherwise at the time computing device 110 is manufactured and prior to being delivered to a user (e.g., consumer). In some examples, one or more application modules 124 may be installed by a user of computing device 110 after delivery to the user. For example, a user of computing device 110 may interact with application repository module 126 of ISS 117 to cause computing device 110 to download and install one or more application modules 126.

UI module 120 manages user interactions with PSD 112 and other components of computing device 110. For example, UI module 120 may output a user interface and may cause PSD 112 to display the user interface as a user of computing device 110 views output and/or provides input at PSD 112. UI module 120 may receive one or more indications of input from a user as the user interacts with the user interfaces (e.g., PSD 112). UI module 120 may interpret inputs detected at PSD 112 and may relay information about the detected inputs to one or more associated platforms, operating systems, applications, and/or services executing at computing device 110, for example, to cause computing device 110 to perform functions. For instance, UI module 120 may cause PSD 112 to present user interface 114.

User interface 114 is a graphical user interface that provides access to the digital distribution platform provided by ISS 117 and application repository module 126. User interface 114 include graphical elements displayed at various locations of PSD 112. For example, as illustrated in FIG. 1, user interface 114 includes a plurality of regions, including header region 170A and content region 170B. Header region 170A includes tabs that represent different graphical user interfaces that may be displayed at PSD 112. For example, header region 170A includes a "popular apps" tab 172A and an "alternate apps" tab 172B (collectively, "tabs" 172"). Each tab of tabs 172 may enable computing device 110 to display a set of application icons at content region 170B of user interface 114. For example, UI module 120 may detect a user input to select one of tabs 172 as an active tab. An active tab may refer to a tab that is currently being used, such that information associated with the active tab may be currently displayed as part of graphical user interface 114. For example, responsive to receiving a user input to select alternate apps tab 172B as the active tab, UI module 120 may cause PSD 112 to display graphical user interface 114 that includes application icons 174A and 174B (collectively, "application icons 174") at content region 170B. For instance, content region 170B may include a first application icon 174A associated with an alternate application entitled "better calendar app" 174A and a second application icon 174B associated with an alternate application entitled "better weather app". In some instances, header region 170A may include additional or fewer tabs 172. Similarly, content region 170B may include additional or fewer application icons 174.

UI module 120 may receive information and instructions from one or more associated platforms, operating systems, applications, and/or services executing at computing device 110 and/or one or more external computing systems (e.g., ISS 117). In addition, UI module 120 may act as an intermediary between the one or more associated platforms, operating systems, applications, and/or services executing at computing device 110, various output devices of computing device 110 (e.g., speakers, LED indicators, audio or electrostatic haptic output device, etc.) to produce output (e.g., a graphic, a flash of light, a sound, a haptic response, etc.) with computing device 110.

In some examples, computing device 110 may include an application recommendation module 122. In other examples, ISS 117 may include (e.g., as part of application repository module 126) an application recommendation module that may perform at least part of the functionality provided by application recommendation module 122 of computing device 110, as described in more detail with reference to FIG. 2. In other words, while generally described as being performed by computing device 110, the operations and functionality of application recommendation module 122 may execute as part of a service, platform, or module executing at ISS 117 and accessed by computing device 110.

Application recommendation module 122 may generally determine a level of user engagement associated with applications executing at computing device 110 and provide alternate application recommendations based on the level of user engagement. Application recommendation module 122 may receive an indication of user interaction with one or more applications of application modules 124. In some examples, the indication of user interaction may include an application usage log or other type of information data structure that includes information about the number of times the user interacts with a particular application (e.g., a weather application) within a certain time period (e.g., within the last 30 days, within the last three months, etc.) and/or indicates the amount of time the user interacts with the particular application when the user interacts with the application. In some examples, a user may be considered to be interacting with an application during a period of time when that application is displayed at PSD 112 or when that application is executing (e.g., as a foreground and/or background process) at computing device 110. For instance, the amount of time a user interacts with a music application may include the amount of time the music application plays music, even if the music application is not displayed at PSD 112. In some examples, the indication of user interaction with one or more applications may include an indication of a user input to leave an application details pages (e.g., a details page that is part of a graphical user interface that represents application recommendation module 126) associated with an application without installing the application, or an indication of a user input to uninstall an application.

When computing devices (e.g., computing device 110, ISS 117, and/or remote computing device 118) receive user interaction information associated with individual users or when the information is genericized across multiple users, all personally-identifiable-information such as name, address, telephone number, and/or e-mail address linking the information back to individual people may be removed before being stored. Computing device 110 and/or ISS 117 may further encrypt the information to prevent access to any information stored therein. In addition, computing devices may only store information associated with users of computing devices if those users affirmatively consent to such collection of information. The computing devices may further provide opportunities for users to withdraw consent and in which case, the computing devices may cease collecting or otherwise retaining the information associated with that particular user.

Application recommendation module 122 may determine a user engagement score associated with one or more applications of application modules 124. In some examples, application recommendation module 122 may determine the user engagement score based on the indication of user interaction. The user engagement score may indicate at least one of how frequently the user interacts with an application and/or how long the user interacts with the application and may be modified based on various interaction data between a user and the application, such as, detecting a user command to uninstall the application, a user command to leave a details page representative of the application, or other inputs or information that indicate how much or how little the user is engaged with the application over time.

In some examples, application recommendation module 122 may assign a higher user engagement score the more frequently a user interacts with a particular application and the level of frequency may depend on the type of application. For instance, if a user interacts with a weather application frequently (e.g., once per day, once a week, etc.), this may indicate that a user is satisfied with the weather application (e.g., if the frequency of interactions with the weather application is greater than or equal to a typical frequency of use by other users of the weather application or weather applications in general). Application recommendation module 122 may assign a high user engagement score (e.g., 90 out of 100) to the weather application if a user interacts with the weather application frequently. However, in some examples, if a user interacts with a social media application with the same or with less frequency as the weather application (e.g., once every two weeks, once a month, etc.), this may indicate that the user is not satisfied with the social media application (e.g., if the frequency of interactions with the social media application is less than a typical frequency of use by other users of the social media application or social media applications in general). Application recommendation module 122 may assign a low user engagement score (e.g., 15 out of 100) to the social media application if the user interacts with the social media application infrequently.

In some examples, application recommendation module 122 may assign a higher user engagement score as the duration of user interaction with an application increases. For example, if the average duration of user interaction with a social media application is 20 minutes, application recommendation module 122 may assign a high user engagement score (e.g., 75 out of 100) to the social media application. However, if the average duration of user interaction with a news application is two minutes, application recommendation module 122 may assign a low engagement score (e.g., 25 out of 100) to the news application. Similar to frequency of use, the level of duration of user interaction may depend on the type of application.

In some examples, the user engagement score may be modified based on various interaction data between a user and the application. For example, the user engagement score may be determined, modified, or otherwise adjusted based on receiving a command to uninstall a particular application. For example, if UI module 120 detects a user input to uninstall a particular application, application recommendation module 120 may modify the user engagement score by setting the user engagement score associated with the particular application to a minimum user engagement score (e.g., 0 out of 100). In some examples, the user engagement score may be determined, modified, or otherwise adjusted based on receiving a command to leave a details page associated with the particular application without installing the particular application. For example, graphical user interface 114 may include a representation of application repository module 126 and details (e.g., a description and/or user reviews) associated with the particular application. If UI module detects a user input to leave the details page (e.g., a user input to select a back button) without installing the particular application, application recommendation module 120 may adjust the engagement score by setting the setting the user engagement score to a minimum user engagement score (e.g., 0 out of 100).

Application recommendation module 122 may determine whether the user engagement score associated with a particular application satisfies a threshold user engagement score. The threshold user engagement score may be used to indicate whether a user is satisfied with a particular application. For example, if the user engagement score associated with a particular application satisfies (e.g., is greater than or equal to) the threshold user engagements score, this may indicate that the user is satisfied with the particular application. However, if the user engagement score associated with a particular application does not satisfy the threshold user engagement score, this may indicate that the user is not satisfied with the particular application. Thus, if the user engagement score associated with a particular application does not satisfy the threshold user engagement score, application recommendation module 122 may determine one or more alternate applications to substitute for the particular application. The one or more alternate applications may be chosen from the set of applications that are alternatives to the particular application.

In some examples, application recommendation module 122 may determine a set of one or more applications that are alternatives to the particular application, which may be referred to as a set of alternate applications. In some examples, the each application in the set of alternate applications may include functionality that is similar to the functionality of the particular application. For example, if the particular application is a calculator application, application recommendation module 122 may determine that the set of alternate applications includes applications that perform mathematical operations. Similarly, if the particular application is a weather application, application recommendation module 122 may determine that the set of alternate applications includes applications that show weather forecasts, current weather information, and/or historical weather information.

In some examples, application recommendation module 122 may determine an alternate application to substitute for the particular application by determining a respective group engagement score for each application in the set of alternate applications. The respective group engagement scores may indicate how satisfied a group of users are with the respective alternate applications in the set of alternate applications. Application recommendation module 122 may determine the respective group engagement scores associated with each alternate application based on aggregated user interaction data received from a group of one or more remote computing device 118 that are associated with the group of one or more users. In other words, application recommendation module 122 may assign a respective group engagement score to each alternate application based on the aggregated user interaction data. In some instances, application recommendation module 122 may select a single alternate application that is the highest ranked application in the set of alternate applications as a substitute for the particular application. For example, application recommendation module 122 may sort the group engagement scores associated with the respective alternate applications, determine that the highest ranked alternate application is the alternate application associated with the largest group engagement score, and select the highest ranked application in the set of alternate applications to substitute for the particular application. For instance, application recommendation module 122 may determine that the "better calculator app" is an alternate application for a previously installed calculator application because the "better calculator app" is the application with the largest group engagement score from the set of alternate calculator applications. Similarly, application recommendation module 122 may determine that the "better weather app" is an alternate application for a previously installed weather application because the "better weather app" is the application with the largest group engagement score from the set of alternate weather applications.

In some examples, responsive to determining one or more applications from the set of alternate applications to present to the user as potential substitutes for the particular application, application recommendation module 122 may send an indication of the selected alternate applications to UI module 120 for display at PSD 112. In some examples, application recommendation module 122 may send the indication of the alternate applications for display as a notification. In other examples, application recommendation module 122 may send the indication of the alternate applications for display as part of an application repository graphical user interface. For example, UI module 120 may receive the indication of the alternate application and may generate a graphical user interface associated with application repository 126 and the selected alternate application. In other words, graphical user interface 114 includes a visual representation of application repository module 126. As illustrated in FIG. 1, graphical user interface 114 includes a plurality of application icons 174 associated with the respective alternate applications within content region 170B. Responsive to generating the graphical user interface associated with application repository module 126, UI module 120 may cause PSD 112 to display the graphical user interface.

As described above, application recommendation module 122 may determine one or more alternate applications as a substitute for a particular application. In some examples, application module 122 may determine one or more respective alternate applications for more than one application. For example, application recommendation module 122 may determine one or more alternate applications for a first application and one or more alternate applications for a second application. For instance, as illustrated in FIG. 1, application recommendation module 122 may determine an alternate application for a calculator application and an alternate application for a weather application, and UI module 120 may generate user interface 114 that includes a first application icon 174A associated with the alternate calculator application and a second application icon 174B associated with the alternate weather application. While content region 170B of user interface 114 includes two application icons 174, content region 170B may include any number of icons 174 that represent alternate applications for any number of applications installed at computing device 110.

Figure 2:
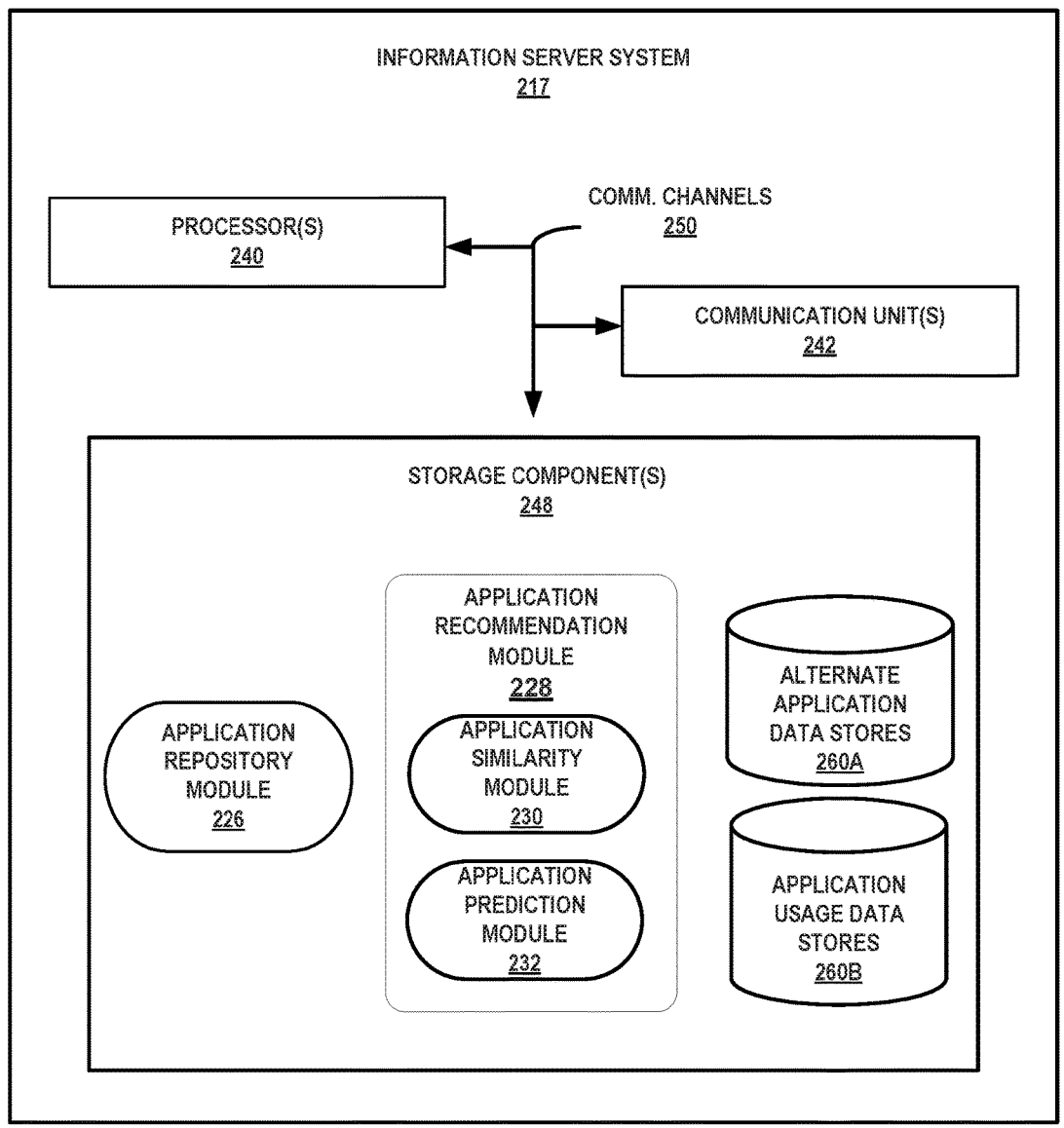
FIG. 2 is a block diagram illustrating an example computing device that is configured to output an indication of an alternative application, in accordance with one or more aspects of the present disclosure.

In this way, the techniques of the disclosure may enable a computing device to identify application that have a low level of user engagement and to predict alternate applications that are not currently installed at the computing device but are more likely to obtain higher user engagement scores. By determining applications that are more likely to obtain a higher user engagement score, the computing device may automatically present potential alternate applications to the user. By presenting the alternate applications that are more likely to obtain a higher user engagement score, the computing device may reduce the number of unused applications that are installed at the computing device, which may reduce the computing resources (e.g., volatile memory, non-volatile memory, and/or processing power) consumed by the unused applications. Reducing the computing resources consumed by unused applications may increase performance of the computing device and/or decrease the electrical power consumed by the computing device. In addition, by having more applications that are likely to be used or obtain higher user engagement scores, overall user satisfaction with the computing device may be improved over other devices that do not perform the described techniques. FIG. 2 is a block diagram illustrating an example computing device, such as an ISS, that is configured to output an indication of an alternative application, in accordance with one or more aspects of the present disclosure. ISS 217 of FIG. 2 is described below as an example of ISS 117 illustrated in FIG. 1. FIG. 2 illustrates only one particular example of ISS 217, and many other examples of ISS 217 may be used in other instances and may include a subset of the components included in example ISS 217 or may include additional components not shown in FIG. 2. FIG. 2 is described in the context of system 100 of FIG. 1.

As shown in the example of FIG. 2, ISS 217 includes one or more processors 240, one or more communication units 242, and one or more storage components 248. Storage components 248 may include application repository module 226 and application recommendation module 228. Application recommendation module 228 may include application similarity module 230 and application prediction module 232. Additionally, storage components 248 are configured to store alternative application data stores 260A and application usage data stores 260B (collectively, "data stores 260"). Communication channels 250 may interconnect each of the components 240, 242, and 248 for inter-component communications (physically, communicatively, and/or operatively). In some examples, communication channels 250 may include a system bus, a network connection, an inter-process communication data structure, or any other method for communicating data.

One or more communication units 242 of ISS 217 may communicate with external devices (e.g., computing device 110 of FIG. 1) via one or more wired and/or wireless networks by transmitting and/or receiving network signals on the one or more networks. Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular data radios, wireless network radios, as well as universal serial bus (USB) controllers.

One or more processors 240 may implement functionality and/or execute instructions associated with ISS 217. Examples of processors 240 include application processors, display controllers, auxiliary processors, one or more sensor hubs, and any other hardware configure to function as a processor, a processing unit, or a processing device. Modules 226, 228, 230, and 232 may be operable by processors 240 to perform various actions, operations, or functions of ISS 217. For example, processors 240 of ISS 217 may retrieve and execute instructions stored by storage components 248 that cause processors 240 to perform the operations of modules 226, 228, 230, and 232. The instructions, when executed by processors 240, may cause ISS 217 to store information within storage components 248.

One or more storage components 248 within ISS 217 may store information for processing during operation of ISS 217 (e.g., ISS 217 may store data accessed by modules 226, 228, 230, and 232 during execution at ISS 217). In some examples, storage component 248 is a temporary memory, meaning that a primary purpose of storage component 248 is not long-term storage. Storage components 248 on ISS 217 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 226, 228, 230, and 232, as well as data stores 260. Storage components 248 may include a memory configured to store data or other information associated with modules 226, 228, 230, and 232, as well as data stores 260.

Storage components 248 may include an application repository module 226. Application repository module 226 may be an example of, and provide the functionality of, application repository module 126 of FIG. 1. For example, application repository module 226 may provide a digital distribution platform related to computing software and may provide access to a plurality of applications that may be downloaded from ISS 217 to an external computing device (e.g., computing device 110 of FIG. 1). For instance, computing device 110 may display a graphical user interface representative of application repository module 226 and may receive a user input that causes computing device 110 to install the particular application.

In some examples, ISS 217 may interact with one or more external computing devices (e.g., computing device 110). Computing device 110 may include one or more applications installed at the memory of the computing device 110, which may be installed during the manufacture of computing device 100 or installed by a user of computing device 110 from application repository module 226 of ISS 217. Computing device 110 may receive a user input to interact with a particular application. For example, computing device 110 may receive a user input to select a particular application and may execute the particular application. The user may be considered to be interacting with the particular application during a period of time when the particular application is displayed at PSD 112 of computing device 110 or when the particular application is executing (e.g., as a background and/or foreground process) at computing device 110. In some examples, a user of a computing device 110 may interact with a particular application by causing computing device 110 to uninstall the application. In some examples, the user may interact with the particular application by causing computing device 110 to display a graphical user interface representative of an application repository, where the graphical user interface includes a details page associated with the particular application.

Application recommendation module 228 may generally determine a level of user engagement associated with applications executing at computing device 110 of FIG. 1 and provide alternate application recommendations based on the level of user engagement. In some examples, application recommendation module 228 may include all functionality of application recommendation module 122 of computing device 210 of FIG. 1 and may perform similar operations as application recommendation module 122 for outputting indications of a second application that is an alternative to a first application. Application recommendation module 228 may include various submodules, such application similarity module 230 and application prediction module 232, which may perform the functionality of application recommendation module 228.

Application prediction module 232 may, in general, predict a level of user engagement with a particular application and predict one or more applications that are more likely to obtain a higher user engagement. Application prediction module 232 may receive, via communication channel 250, an indication of user interaction with a particular application from computing device 110. In some examples, the indication of user input may include an indication of a command to uninstall an application, a command to leave a details page associated with an application without installing the application, or an application usage log or other type of information data structure that includes information about how frequently or how long the user uses one or more applications. The application usage log or other data structure may include information about how frequently a particular application is used. For instance, the application usage log may include an entry for each time an application is launched or a count of the number of times an application has been launched within a particular time period (e.g., two weeks, two months, etc.). Additionally, or alternative, the application or other data structure may include information about how long the application is used. For instance, the application usage log may include the amount of time the user interacted with an application each time the application was used or may include an average amount of time the user interacts with application when the user interacts with the application.

In some examples, application prediction module 232 may store the received user interaction data in application usage data stores 260B. Alternate usage data stores 260B may include application user interaction data received from computing device 110. For instance, alternate usage data stores 260B may include a respective count of the number of times a user interacted with a respective application and/or the average duration of user interaction the user interacted with each respective application. In some examples, alternate usage data stores 260B may include user interaction data received from one or more remote computing device 118, as discussed in more detail below.

In response to receiving the indication of user interaction with the particular application, application prediction module 232 may determine a user engagement score associated with the particular application based on the user interaction with the particular application. The user engagement score may indicate at least one of how frequently the user uses the particular application and/or how long the user uses the particular application. In some examples, application prediction module 232 may infer that a user is satisfied with a particular application the more the user interacts with the application. For instance, if a user interacts with a social media application every day, this may indicate that the user enjoys spending time interacting with the social media application. Thus, in some examples, application prediction module 232 may determine that the user engagement score associated with a particular application is higher the more the user interacts with the particular application. In other examples, application prediction module 232 may likewise infer that a user is satisfied with a particular application the less the user interacts with the application. For instance, if a user interacts with a weather application, as opposed to a social media application, for short durations, this may indicate that the user receives relevant information quickly, and is therefore satisfied with the weather application. Thus, in some examples, application prediction module 232 may determine that the user engagement score associated with a particular application is higher the less the user interacts with the particular application. In this way, application prediction module 232 may vary the determination of the user engagement score based on the type of application being evaluated.

In some examples, application prediction module 232 may determine the user engagement score associated with a particular application based on how frequently or how long the user interacts with the particular application relative to other users (e.g., other similar users) who interact with the particular application or applications that are similar to the particular application. For example, application prediction module 232 may assign a medium or mid-level user engagement score (e.g., 50 out of 100) to an application if the user interacts with the application with approximately the same frequency that other users interact with the application. For instance, if a group of users interacts with a gaming application eight times a month (e.g., twice a week), and a user of computing device 110 interacts with the gaming application six to ten times a month (in other words, within 25% of the average for a group of similar users), application prediction module 232 may determine that the user engagement score associated with the gaming application is between 40 out of 100 and 60 out of 100. Application prediction module 232 may determine that the user engagement score associated with the gaming application is high (e.g., 80 out of 100) if the user interacts with the gaming application more frequently that other users interact with the gaming application, and may determine that the user engagement score associated with the gaming application is low (e.g., 20 out of 100) if the user interacts with the gaming application less frequently than other users interact with the gaming application. Similarly, application prediction module 232 may determine the user engagement associated with a particular application based on how long the user interacts with a particular application relative to other users who use the particular application or applications that are similar to the particular application. For instance, application prediction module 232 may determine that the user engagement score associated with a particular application is high if the typical duration of the user's interaction with the application is longer than the typical duration of interaction for other users.

In some examples, application prediction module 232 may determine that the user engagement score associated with a particular application is higher the more the particular application is used by the user, regardless of how frequently other users interact with the particular application. For instance, application prediction module 232 may determine that the user engagement score associated with a particular application is low (e.g., 10 out of 100) if the user interacts with the particular application once a month, that the user engagement score is a medium score (e.g., 50 out of 100) if the user interacts with the particular application once a week, or high (e.g., 90 out of 100) if the user interacts with the particular application once a day. In some examples, application prediction module 232 may determine the user engagement score based on the type of application. For instance, application prediction module 232 may determine that the user engagement score associated with a calculator application is high if the user interacts with the calculator application once a week, but may determine that the user engagement score associate with a news application is low if the user interacts with the news application only once a week. Similarly, application prediction module 232 may determine the user engagement associated with a particular application based on how long the user interacts with a particular application, regardless of how long other users interact with the particular application. For instance, if the user typically interacts with a particular application for a few (e.g., three) minutes, application prediction module 232 may determine that the user engagement score associated with particular application is lower than if the user typically interacts with the particular application for more than a few minutes (e.g., ten minutes).

In some examples, the user engagement score may be modified or adjusted based on various user interaction between a user and the particular application. For example, responsive to receiving an indication of user input to uninstall a particular application from the memory of computing device 110, application prediction module 232 may determine an updated user engagement score and may set the user engagement score associated with the particular application to a minimum score (e.g. 0 out of 100). Similarly, the user engagement score may be modified or adjusted based on receiving a command to leave a details page associated with an application without installing the application to computing device 110. In response to receiving the indication of user input to leave the details page without installing the application, application prediction module 232 determine an updated user engagement score and may set the user engagement score associated with the particular application to be a minimum score (e.g., 5 out of 100). In some examples, in response to receiving an indication of user input to uninstall an application or an indication of user input to leave a details page associated with an application, application prediction module 232 may reduce the user engagement score towards a minimum score rather than setting the score to the minimum score. For instance, a user may interact with a particular application frequently and may still uninstall the application (e.g., unintentionally). In some instances, a user may view the details page associated with an application and may leave the details page without installing the application (e.g., accidentally, because user is connected to a cellular network and wants to download the application over a WiFi network, etc.) Thus, in some examples, application prediction module 232 may reduce the user engagement score towards a minimum score, for example, by multiplying the user engagement score by some factor (e.g., 10%, 15% etc.) or subtracting a factor from the user engagement score (e.g., if the user engagement score is on a scale from 0 to 100, subtract 50 points).

Application prediction module 232 may determine whether the user engagement score associated with a particular application satisfies a threshold user engagement score. The threshold user engagement score may be used to indicate whether a user is satisfied with a particular application. For example, if the user engagement score associated with a particular application satisfies (e.g., is greater than or equal to) the threshold user engagements score, application prediction module 232 may infer that the user is satisfied with the particular application and may take no additional action. However, if the user engagement score associated with a particular application does not satisfy the threshold user engagement score, application prediction module 232 may infer that the user is not satisfied with the particular application and determine an alternate application to substitute for the particular application. The alternate application may be chosen from the set of applications that are alternatives to the particular application.

Application similarity module 230 may determine a set of one or more applications that are alternatives to a particular application, which may be referred to as a set of alternate applications. In some examples, the one or more alternate applications in the set of alternate applications may include functionality that is similar to the functionality of the particular application and therefore may be suitable alternatives to the particular application. In some examples, application similarity module 230 may determine alternate applications based on keywords that are used to describe applications within application repository module 226. For example, application repository module 226 may include metadata associated with each respective application within application repository module 226. The metadata may include a description and/or user reviews (e.g., comments and rankings) for each respective application in application repository module 226. In some examples, for each application in application repository module 226, application similarity module 230 may determine keywords (e.g., individual words or phrases) within the metadata (e.g., description and/or user comments) that describe each respective application, the features of each respective application, the uses of each respective application, or any combination therein. In some examples, each application within application repository module 230 may be a candidate to substitute for the particular application. Application similarity module 230 may compare the keywords associated with the particular application to keywords associated with one or more candidate applications within application repository module 230 to determine which candidate applications are alternatives to the particular application. For example, application similarity module 230 may determine that a candidate application is an alternative to the particular application if the candidate application is associated with a certain number of keywords that are also associated with, or are similar to keywords that are associated with, the particular application.

Responsive to determining one or more applications in the set of alternate applications, application similarity module 230 may store, within alternate application data stores 260A, an indication of the particular application and the set of alternate applications associated with the particular application. Alternate application data stores 260A may include one or more sorted databases (e.g., hash tables, linked lists, sorted arrays, graphs, etc.) that represent each application within application repository module 226 and a set of alternate applications associated with each application. For example, each database may include an identifier to uniquely identify each application and an identifier (e.g., a textual label, a numerical label, or other identifier) associated with each respective alternate application associated with each respective application.

Application similarity module 230 may receive one or more indications of user input associated with a group of remote computing devices (e.g., one or more remote computing devices 118) used by a group of users. The one or more indications of user input may indicate user interactions by a group of users with the particular application, with one or more alternate applications in the set of alternate applications, or both. Application similarity module 230 may generate, based on the one or more indications of user input associated with the group of remote computing devices 118, aggregate user interaction data for the particular application, for each respective alternate application in the set of alternate applications, or both. In some examples, the aggregate user interaction data may include information about the aggregate frequency and/or duration of interaction by the group of users with particular application and each respective alternate application.

In some examples, the aggregate user interaction data may include a count of the number of times the group of remote computing 118 devices displayed a graphical user interface representative of a details page associated with a particular application and installed an alternate application without installing the particular application. For example, ISS 217 may output an indication of a details page associated with the particular application and may cause a remote computing device of the group of remote computing devices 118 to display a graphical user interface associated with an application repository, where the graphical user interface includes the details page associated with the particular application. However, in some instances, at least some users in the group of users may choose not to install the particular application and may cause the respective remote computing devices 118 to install an alternate application from the set of alternate applications. As a result, in some examples, application similarity module 230 may store a count of the number of times the details page associated with the particular application was displayed, a count of the number of times the particular application was not installed after displaying the details page, a count of the number of times the alternate application was installed, or a combination therein. In some examples, application similarity module 230 may store the counts within application usage data stores 260B.

In some examples, the aggregate user interaction data may include a number of times the group of remote computing devices 118 uninstalled the particular application and installed an alternate application from the set of alternate applications. For example, a group of users may cause the respective remote computing devices 118 to install the particular application. At least some of the users may cause the respective remote computing devices 118 to uninstall the particular application and install a second, alternate application as a substitute for the first application. As a result, in some examples, application similarity module 230 may store, to application usage data stores 260B, a count of the number of times the group of remote computing devices 118 uninstalled the particular application and installed the alternate application.

In some examples, the aggregate user interaction data may include an indication of which application from the particular application and an alternative application is utilized the most. For example, a group of remote computing devices 118 may include the particular application and an alternate application from the set of alternate applications. In some instances, each computing device of the remote computing devices 118 may send, to ISS 217, an indication of which application (e.g., the particular application or the alternate application) the respective users interact with the most. For instance, each remote computing device 118 may send a usage log to ISS 217 that enables application similarity module 230 to determine which application the respective user interacts with the most or may send a message to ISS 217 indicating which application the respective user interacts with the most. Application similarity module 230 may receive the user interaction data from the respective remote computing devices 118 and may store, to application usage data stores 260B, an indication of which application (from the particular application and the alternate application) that the group of users interact with the most.

Application similarity module 230 may determine a group engagement score associated with each respective alternate application in the set of alternate applications. The respective group engagement scores may indicate how satisfied the group of users are the respective alternate applications. The respective group engagement scores may be based at least in part on the aggregate user interactions with each respective alternate application.

In some examples, application similarity module 230 may determine the respective group engagement scores based on the aggregate user interactions with the particular application and on the aggregate user interactions with the respective alternate applications. For example, application similarity module 230 may determine the respective group engagement scores by comparing the aggregate user interaction data associated the respective alternate applications to the aggregate user interaction data associated with the particular application. As described above, the aggregate user interaction data may include one or more factors, such as: data associated with a group of remote computing devices 118 that displayed details page associated with the particular application and installed the alternate application without installing the particular application, data associated with a group of remote computing devices 118 that uninstalled the particular application and installed an alternate application, data associated with a group of remote computing devices 118 that include the particular application and the first alternate application, or any combination of the above. In some examples, each factor may be weighted the same. In other examples, at least one of the factors may be weighted differently than the other factors.

Application similarity module 230 may determine the group engagement score associated with an alternate application based on the aggregate user interaction data associated with a group of remote computing devices 118 that displayed a details page associated with the particular application and installed the alternate application without installing the particular application. Application similarity module 230 may assign a higher group engagement score as more remote computing devices 118 that have displayed the details page associated with the particular application install the alternate application without installing the particular application. application. For instance, if the aggregate user interaction data indicates that 10% of remote computing devices 118 that display a details page associated with the particular application eventually install a first alternate application without installing the particular application, application similarity module 230 may determine that the group engagement score associated with the first alternate application is low (e.g., 15 out of 100). However, if the aggregate user interaction data indicates that 40% of remote computing devices 118 that display a details page associated with the particular application eventually install a second alternate application without installing the particular application, application similarity module 230 may determine that the group engagement score associated with the second alternate application is high (e.g., 95 out of 100).

Application similarity module 230 may determine the group engagement score associated with an alternate application based on the aggregate user interaction data associated with a group of remote computing devices 118 that uninstalled the particular application and installed an alternate application. Application similarity module 230 may assign a higher group engagement score to an alternate application as more remote computing devices 118 uninstall the particular application and install the alternate application. For instance, if the aggregate user interaction data indicates that 5% of remote computing devices 118 that install the particular application eventually uninstall the particular application and install a first alternate application, application similarity module 230 may determine that the group engagement score associated with the first alternate application is low (e.g., 20 out of 100). However, if the aggregate user interaction data indicates that 30% of remote computing devices 118 that install the particular application eventually uninstall the particular application and install a second alternate application, application similarity module 230 may determine that the group engagement score associated with the second alternate application is high (e.g., 75 out of 100).

Application similarity module 230 may determine the group engagement score associated with an alternate application based on the aggregate user interaction data associated with a group of remote computing devices 118 that have installed the particular application and the alternate application. Application similarity module 230 may assign a higher group engagement score to the alternate application as the user interactions with the alternate application increase relative to the user interactions with the particular application. For instance, if the aggregate user interaction data indicates that the group of users who have installed the particular application and a first alternate application interact with the first alternate application 10% more (10% more frequently or 10% longer) than the group of users interacts with the particular application, application similarity module 230 may determine that the group engagement score associated with the first alternate application is low (e.g., 20 out of 100). However, if the aggregate user interaction data indicates that the group of users who have installed the particular application and a second alternate application interact with the second alternate application 100% more (100% more frequently or 100% longer) than the group of users interacts with the particular application, application similarity module 230 may determine that the group engagement score associated with the second alternate application is high (e.g., 90 out of 100).

In some examples, application similarity module 230 may determine the respective group engagement scores independent of user interactions with other alternate applications and/or independent of user interactions with the particular application. For example, application similarity module 230 may determine the respective group engagement scores associated with the respective alternate applications in a manner similar to the method used by application prediction module 232 to determine the individual user engagement score associated with particular application. For instance, application similarity module 230 may increase the respective group engagement scores as the frequency and/or duration of aggregate user interaction with the respective alternate applications by the group of users increases (e.g., regardless of the amount of user interaction with the particular application). In some examples, application similarity module 230 may determine the respective group engagement scores based at least in part on the user reviews (e.g., user comments and ratings) of the respective alternative applications. Responsive to determining the respective group engagement scores associated with each alternate application in the set of alternate applications, application similarity module 230 may store the respective group engagement scores to alternate application data store 260A.

As described above, application prediction module 232 may determine whether the user engagement score satisfies a threshold user engagement score. Responsive to determining that the user engagement score associated with a particular application does not satisfy the threshold user engagement score, application prediction module 232 of application recommendation module 228 may determine one or more alternate applications from the set of alternate applications to substitute for the particular application. Application prediction module 232 may perform a lookup in alternate application data stores 260A to retrieve the set of alternative applications associated with the particular application and the respective group engagement scores associated with each of the alternate applications. In some examples, application prediction module 232 may select a single alternate application from the set of alternate applications to substitute for the particular application. For example, application prediction module 232 may determine to substitute the highest ranked alternate application for the particular application. In other words, application prediction module 232 may determine which alternate application from the set of alternate applications is associated with the largest group engagement score and may select the alternate application with the largest group engagement score as the application to be substituted for the particular application. In some examples, application prediction module 232 may select a plurality of N alternate applications to substitute for the particular application, where N is any positive integer. For example, application prediction module 232 may select the N alternate applications with the largest group engagement scores as substitutes for the particular application.

In some examples, by determining alternate applications that may be similar to an application associated with a low user engagement, application recommendation module 228 may provide a user of computing device 110 with an indication of alternate applications that may be more likely to satisfy the user. For example, responsive to determining one or more alternate application from the set of alternate applications to present to the user, application prediction module 232 may send an indication of the one or more selected alternate applications to computing device 110 (e.g., via communication unit 242). In some examples, application prediction module 232 may send the indication of the one or more selected alternate applications to computing device 110 for display as a notification (e.g., an email, text message, card, pop-up, or other graphical notification). In other examples, the indication of the one or more selected alternate applications may include a message that causes computing device 110 to output a graphical user interface associated with application repository module 226 and the one or more selected alternate applications. For example, as illustrated and described in FIG. 1, a computing device may output a graphical user interface associated with application repository module 226, where the graphical user interface includes application icons indicative of the one or more selected alternate applications.

In some instances, application recommendation module 228 may output an indication of one or more alternative applications to substitute for a particular application without calculating a user engagement score associated with the particular application. For instance, if computing device 110 uninstalls the particular application, application recommendation module 228 may select one or more alternative applications to substitute for the particular application and may output an indication of the selected alternative applications. In some instances, if the user does not interact with the particular application within a predefined amount of time (e.g., two weeks, two months, etc.) or the duration of interaction within a predefined amount of time is less than a threshold duration, application recommendation module 228 may select one or more alternative applications to substitute for the particular application and may output an indication of the selected alternative applications.

Figure 3:
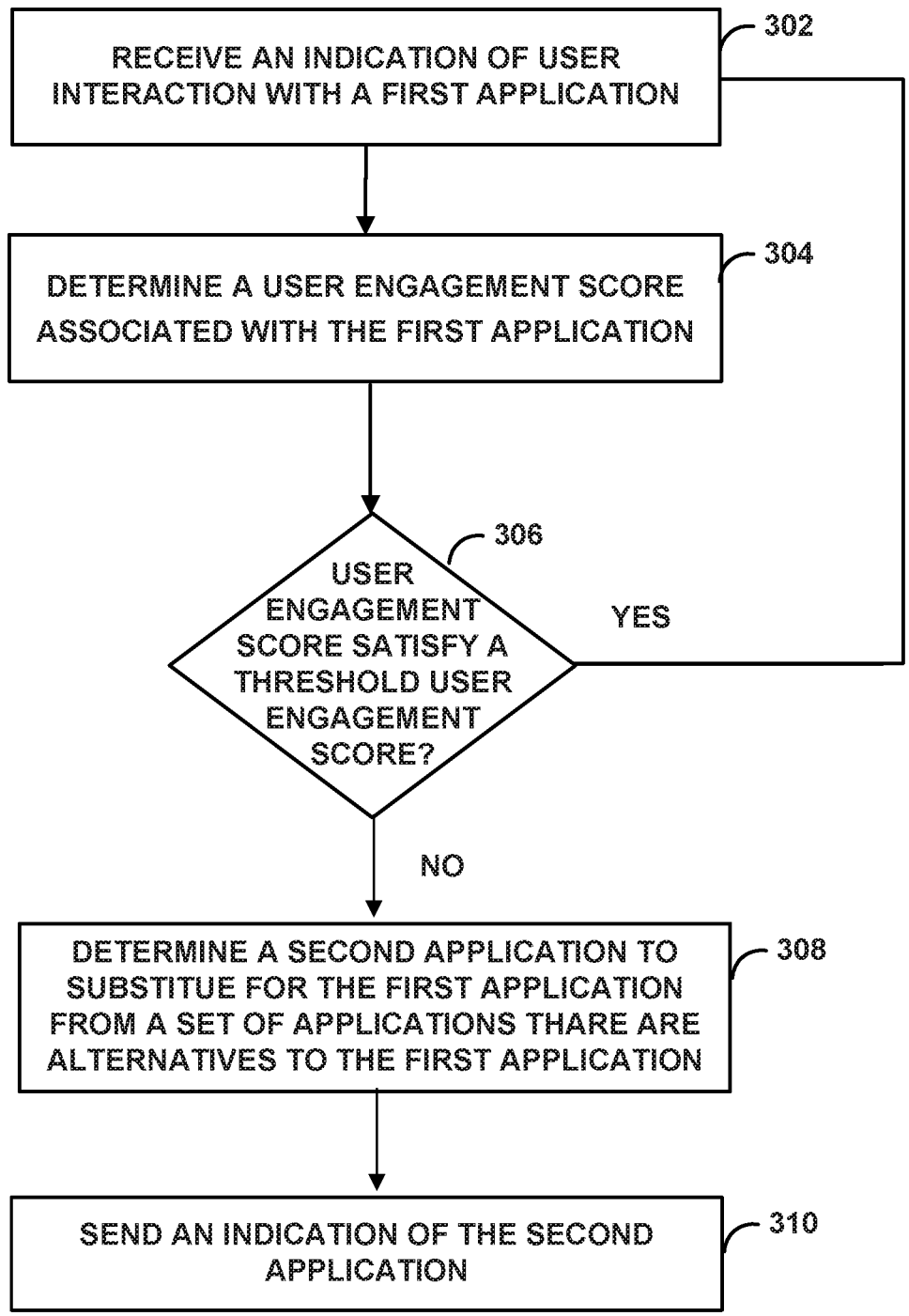
FIG. 3 is a flowchart illustrating example operations of a computing device that is configured to output an indication of an alternative application, in accordance with one or more aspects of the present disclosure.

FIG. 3 is a flowchart illustrating an example operation of the computing device, such as an ISS, that is configured to output an indication of an alternative application, in accordance with one or more aspects of the present disclosure. The process of FIG. 3 may be performed by one or more processors of a computing device, such as ISS 117, 217 as illustrated in FIG. 1 and FIG. 2, respectively. For purposes of illustration only, FIG. 3 is described below within the context of ISS 117 and ISS 217 of FIG. 1 and FIG. 2, respectively.

Application recommendation module 228 may receive, from computing device 110, an indication of user interaction with a first application (302). For example, as a user interacts with computing device 110 (e.g., by providing inputs at PSD 112), computing device 110 may transmit information about the user interactions to ISS 217 as an indication of user interaction (e.g., data). The indication of user interaction may include a usage log or other data structure that includes information about how frequently and/or how long a user of computing device 110 interacts with a first application. In some examples, the indication of user interaction may include an indication of a user input to uninstall the application. In other examples, the indication of user interaction may include an indication of user input to leave an application details page without installing the application.

Application recommendation module 228 may determine a user engagement score associated with the first application (304). For example, application recommendation module 228 may determine the user engagement score based on the user interaction received from computing device 110 and stored at application usage data stores 260B. In some examples, application recommendation module 228 may determine a higher user engagement score as the frequency or duration of user interaction with the first application increases. For example, if the indication of user interaction indicates the user interacts with a music application slightly more than that other users interact with the music application, application recommendation module 228 may set the user engagement score associated with the music application to be equal to 55 (e.g., on a scale of 1 to 100). In other examples, application recommendation module 228 may determine a higher user engagement score as the frequency or duration of user interaction with the first application decreases (e.g., less user interaction may indicate that the application presents relevant information quickly). In some instances, application recommendation module 228 may update a user engagement score by setting the user engagement score to a minimum score if the user interaction includes a command to uninstall the first application or a command to leave a details page associated with the first application without installing the first application.

Application recommendation module 228 may determine whether the user engagement score associated with the first application satisfies a threshold user engagement score (306). For example, application recommendation module 228 may compare the user engagement score to the threshold user engagement score to determine whether the user engagement score is greater than or equal to threshold user engagement score. For instance, if the user engagement score associated with the music application equals 55 and the threshold user engagement score equals 50, application recommendation module 228 may determine that the user engagement score associated with the music application satisfies threshold user engagement score because the user engagement score is greater than the threshold user engagement score. Responsive to determining that the user engagement score satisfies the threshold user engagement score (306, YES path), application recommendation module 228 may infer that the user is satisfied with the music application and should wait to receive another indication of user interaction with an application from computing device 110.

Responsive to determining that the user engagement score does not satisfy the threshold user engagement score (306, NO path), application recommendation module 228 may determine a second application to substitute for the first application, where the second application is selected from a set of applications that are alternatives to the first application (308). The set of alternative applications may include applications that include functionality that is similar to the functionality of the first application. For example, if the first application is a music application, the set of alternate music applications may include one or more of a radio application, a music streaming application, or other application that provides access to music. In some examples, application recommendation module 228 may determine which applications include functionality that is similar to the functionality of the first application based on keywords associated with the respective applications. The keywords may be included in metadata associated with the respective applications (e.g., in a description and/or user reviews associated with the respective applications). For instance, the description of the first music application may include keywords such as "streaming", "hits", "playlists", "music videos", or similar phrases. Thus, application recommendation module 228 may determine that set of alternate applications include applications which include similar keywords.

Application recommendation module 228 may determine a group engagement score associated with each of the respective alternate applications in the set of alternate applications. Application recommendation module 228 may determine the respective group engagement scores based on aggregate user interaction data associated with a group of remote computing devices 118, which are associated with a group of users. In some instances, the aggregate user interaction data may include the number of times the group of remote computing devices 118 displayed a graphical user interface representative of a details page associated with the first music application and installed an alternate music application without installing the particular music application. In some instances, the aggregate user interaction data may include a number of times the group of remote computing devices 118 uninstalled the first music application and installed an alternate music application from the set of alternate music applications. In still other instances, the aggregate user interaction data may indicate, for a group of computing devices that include the first music application and an alternate music application, which application from the particular music application and an alternate music application is utilized the most. Application recommendation module 228 may select one or more alternate applications to present to the user as substitute for the first application. For example, application recommendation module 228 may select the alternate application with the largest group engagement score as the second application to substitute for the first application. For instance, if application recommendation module 228 determines the set of alternate music applications includes three alternate music applications, application recommendation module may determine that the alternate music application with the largest group engagement score should be presented to the user of computing device 110 as a substitute music application.

Application recommendation module 228 may output an indication of the one or more selected alternate applications. For example, application recommendation module 228 may send (e.g., via communication unit 242) an indication of the second application to computing device 110 (310) which may cause a display device (e.g., PSD 112) of computing device 110 to output a graphical indication of the selected alternate applications. In some examples, computing device 110 may output a graphical user interface that includes a notification (e.g. an email, text message, pop-up, or card) indicative of the one or more selected alternate applications. For instance, computing device 110 may receive an indication of a second music application from application recommendation module 228 and may cause PSD 112 to display a card with the message "We see you haven't used your music application much lately. You might like these better." In some examples, computing device 110 may output a graphical user interface that represents application repository module 226, where the graphical user interface includes an indication of the one or more selected alternate applications. For instance, computing device 110 may receive an indication of a second music application and may cause PSD 112 to display a graphical user interface that represents application repository 226. The graphical user interface may include a tab with the message "Were you looking for these? These apps might be better choices!"

Figure 4A:
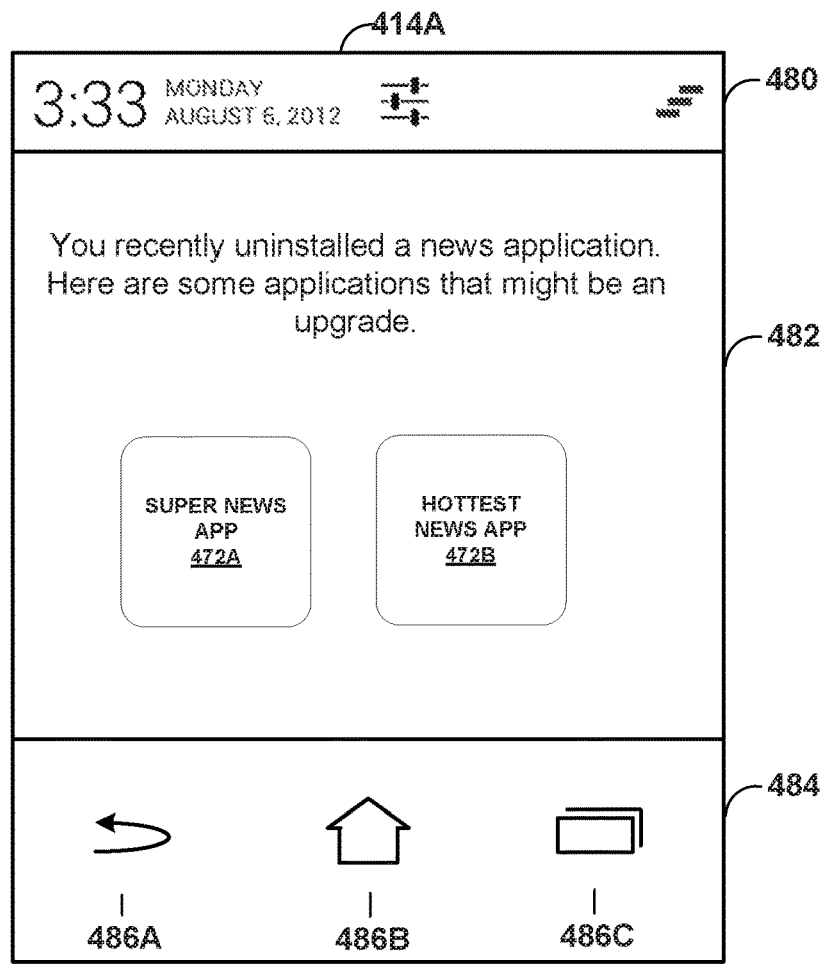
FIG. 4A-4C are conceptual diagrams illustrating example graphical user interfaces of an example computing device that is configured to output an indication of an alternative application, in accordance with one or more aspects of the present disclosure.
Figure 4B:
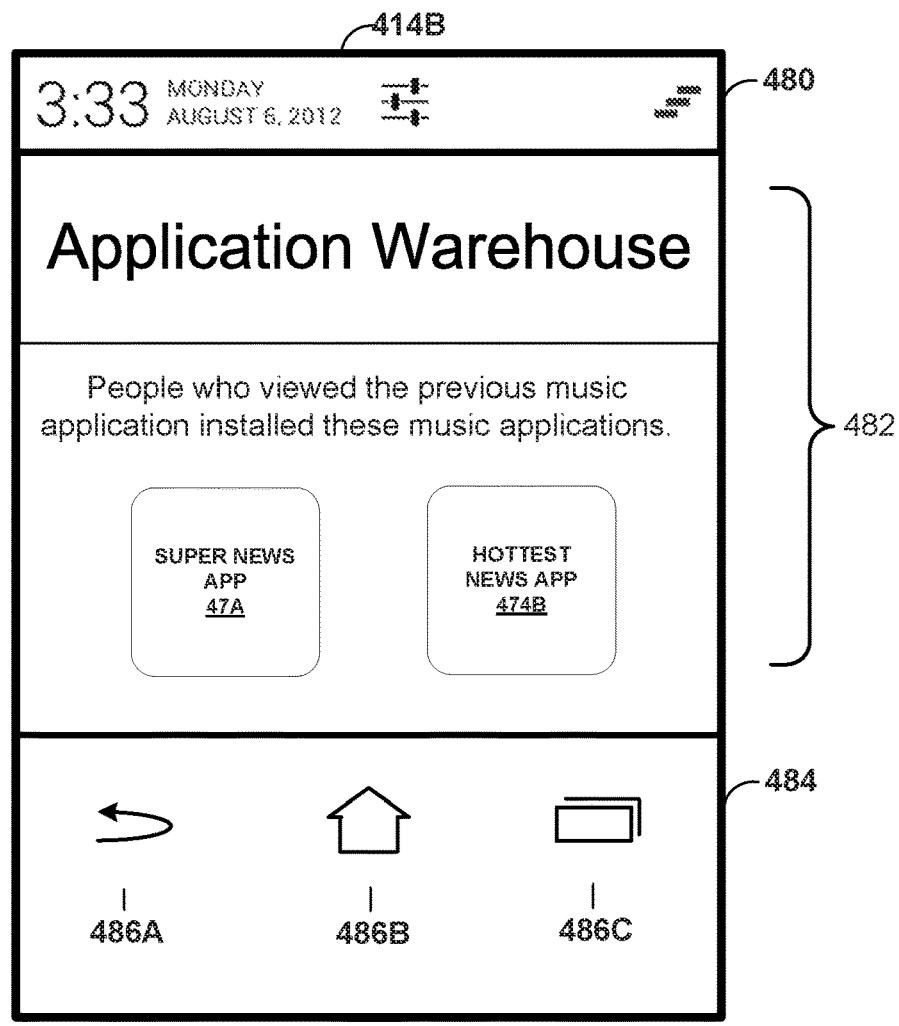
Figure 4C:
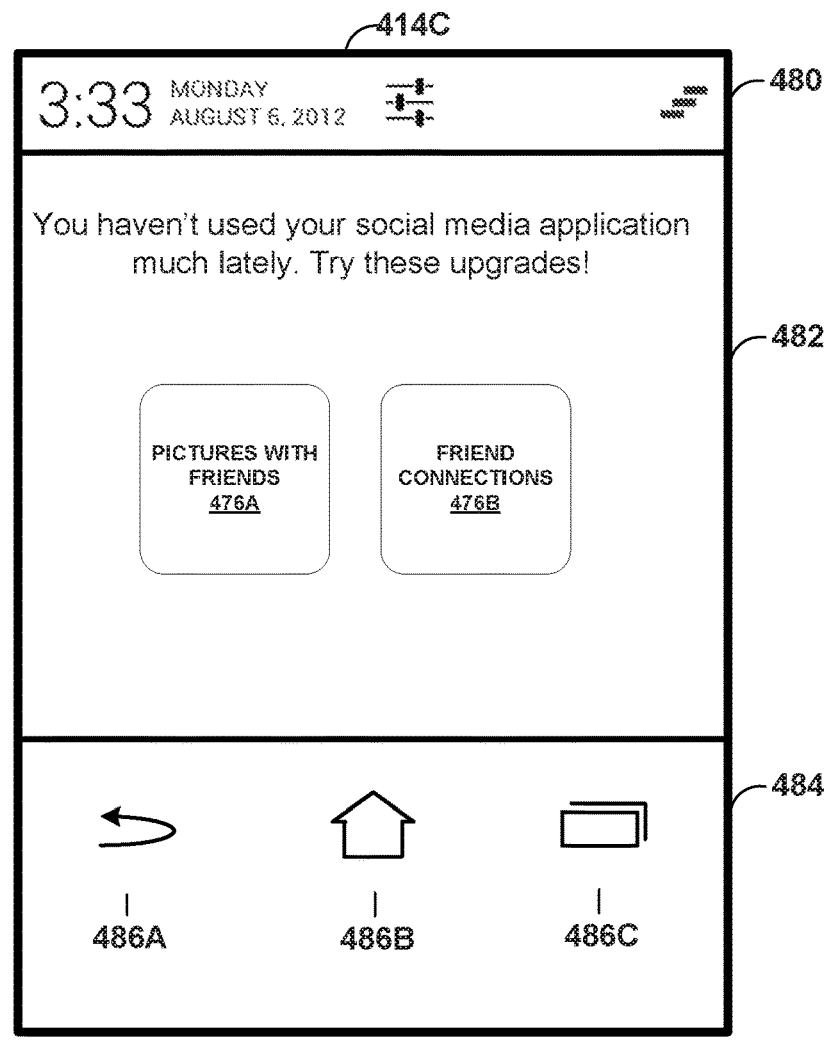

FIG. 4A-4C are conceptual diagrams illustrating example graphical user interfaces of an example computing device that is configured to output an indication of an alternative application, in accordance with one or more aspects of the present disclosure. FIGS. 4A-4C illustrate, respectively, example graphical user interfaces 414A-414C (collectively, user interfaces 414). However, many other examples of graphical user interfaces may be used in other instances. Each of graphical user interfaces 414 may correspond to a graphical user interface output by computing device 110 of FIG. 1. FIGS. 4A-4C are described below in the context of computing device 110 and ISS 117, 217 of FIGS. 1 and 2. As illustrated in the examples of FIGS. 4A-4C, each example graphical user interface 414 includes notification region 480, content region 482, and menu region 484. Notification region 480 may include notifications such as time, date, signal strength, and/or settings. Content region 482 may include graphical elements representative of one or more applications. Menu region 484 may include that represent applications or function of computing device 110. For example, menu region 484 may include a "back" icon 486A, "home icon" 486B, and a "recent apps" icon 486C.

Turning to FIG. 4A, in some examples, a user may interact with an application (e.g., a news application) by causing computing device 110 to uninstall the application. UI module 120 of computing device 110 may receive a user input to uninstall an application. Computing device 110 may send an indication of the user input to ISS 217. Responsive to receiving the indication of user interaction with the news application, application recommendation module 228 of ISS 217 may determine a user engagement score associated with the news application. For example, application recommendation module 228 may update the user engagement score associated with the news application by setting the user engagement score to a minimum score (e.g., 0 out of 100). Application recommendation module 228 may compare the user engagement score associated with the news application to a threshold user engagement score (e.g., 60 out of 100) and may determine that the user engagement score does not satisfy the threshold because the user engagement score is less than the threshold user engagement score.

Application recommendation module 228 may determine a set of alternative applications that are similar to the uninstalled news application and may select one or more alternate applications to substitute for the news application that was uninstalled. Responsive to selecting the one or more alternate news applications, ISS 217 may send an indication of the selected alternate applications to computing device 110.

UI module 120 of computing device 110 may receive the indication of the selected alternate news applications and may output a graphical user interface 414A representative of the selected news applications. For instance, content region 482 of graphical user interface 414A may include the message "You recently uninstalled a news application. Here are some applications that might be an upgrade." Content region 482 may include icons 472A and 472B that represent the alternate applications selected by application recommendation module 228.

Turning to FIG. 4B, in some examples, a user may interact with an application by viewing an application within application repository module 226 of ISS 217. For example, content region 482 of user interface 414B may include a representation of application repository 226 and a details page associated with a particular application (e.g., a music application) within application repository 226. UI module 120 of computing device 110 may receive a user input to leave the details page (e.g., a user input to select "back" icon 486A) without installing the music application. Computing device 110 may send an indication of the user input to ISS 217. Responsive to receiving the indication of user interaction with the music application, application recommendation module 228 of ISS 217 may determine a user engagement score associated with the music application. For example, application recommendation module 228 may update the user engagement score associated with the music application by setting the user engagement score to a minimum score (e.g., 0 out of 100). Application recommendation module 228 may compare the user engagement score associated with the music application to a threshold user engagement score (e.g., 60 out of 100) and may determine that the user engagement score does not satisfy the threshold because the user engagement score is less than the threshold user engagement score.

Application recommendation module 228 may determine a set of alternative applications that are similar to the music application and may select one or more alternate applications to substitute for the music application that was viewed but not installed. Responsive to selecting the one or more alternate news applications, ISS 217 may send an indication of the selected alternate applications to computing device 110.

UI module 120 of computing device 110 may receive the indication of the selected alternate music applications and may output a graphical user interface 414B representative of the selected music applications. For instance, content region 482 of graphical user interface 414B may include the message "People who viewed the previous music application installed these music applications" or a message such as "You may like these applications better." Content region 482 may include icons 474A and 474B that represent the alternate applications selected by application recommendation module 228.

Turning to FIG. 4C, in some examples, a user may interact with an application infrequently and/or for short durations. In some examples, computing device 110 may include an application usage log that includes information about how often and/or for how long a user interacts with an application (e.g., a social media application). Computing device 110 may send an indication of the user interaction to ISS 217 (e.g., by sending an indication of the usage log). Responsive to receiving the indication of user interaction with the social media application, application recommendation module 228 of ISS 217 may determine a user engagement score associated with the social media application. For example, application recommendation module 228 may determine assign a low user engagement score (e.g., 25 out of 100) to the social media application if the usage log indicates that the user interacts with the social media application once a week. Application recommendation module 228 may compare the user engagement score associated with the social media application to a threshold user engagement score (e.g., 50 out of 100) and may determine that the user engagement score does not satisfy the threshold because the user engagement score is less than the threshold user engagement score.

Application recommendation module 228 may determine a set of alternative applications that are similar to the social media application and may select one or more alternate applications to substitute for the social media application that is currently installed at computing device 110. Responsive to selecting the one or more alternate social media applications, ISS 217 may send an indication of the selected alternate applications to computing device 110.

UI module 120 of computing device 110 may receive the indication of the selected alternate social media applications and may output a graphical user interface 414C representative of the selected social media applications. For instance, content region 482 of graphical user interface 414C may include the message "You haven't used your social media application much lately. Try these upgrades!" Content region 482 may include icons 476A and 476B that represent the alternate applications selected by application recommendation module 228.

The following numbered examples may illustrate one or more aspects of the disclosure:

Example 1

A method comprising: receiving, by a first computing device and from a second computing device, an indication of user interaction with a first application; determining, by the first computing device and based on the user interaction with the first application, a user engagement score associated with the first application, the user engagement score indicating at least one of how frequently or how long the user uses the first application; responsive to determining that the user engagement score does not satisfy a threshold user engagement score, determining, by the first computing device and from a set of applications that are alternatives to the first application, a second application to substitute for the first application; and sending, by the first computing device and to the second computing device, for display, an indication of the second application.

Example 2

The method of example 1, wherein sending the indication of the second application comprises sending, by the first computing device and to the second computing device, for display as part of an application repository graphical user interface, the indication of the second application.

Example 3

The method of example 2, further comprising sending, by the first computing device and to the second computing device, for display as part of the application repository graphical user interface, an indication of a details page associated with the first application, wherein the indication of user interaction indicates a user input to leave the details page without installing the first application, and wherein determining the user engagement score includes responsive to receiving the indication of user input to leave the details page without installing the first application, setting, by the first computing device, the user engagement score to a minimum score.

Example 4

The method of any combination of examples 1-3, wherein sending the indication of the second application comprises sending, by the first computing device and to the second computing device, for display as a notification, the indication of the second application.

Example 5

The method of any combination of examples 1-4, wherein: the indication of user interaction indicates a user input to uninstall, by the second computing device, the first application, and determining the user engagement score includes responsive to receiving the indication of user input to uninstall the first application, setting, by the first computing device, the user engagement score to a minimum score.

Example 6

The method of any combination of examples 1-5, wherein determining the second application comprises: determining, by the first computing device and based on aggregate user interactions with each respective application in the set of applications that are alternatives to the first application, a respective group engagement score associated with each application in the set of applications, wherein the aggregate user interactions are associated with a group of remote computing devices; and determining, based on the respective group engagement scores, a highest ranked application in the set of applications as the second application.

Example 7

The method of any combination of examples 1-6, wherein determining the respective group engagement scores associated with each application in the set of applications comprises at least one of: determining, by the first computing device, a number of times the group of remote computing devices display a details page associated with the first application and installs the second application without installing the first application, or determining, by the first computing device, a number of times the group of remote computing devices uninstalls the first application and installs the second application.

Example 8

The method of any combination of examples 1-7, wherein determining the respective group engagement scores associated with each application in the set of applications comprises: determining, by the first computing device, a plurality of computing devices that include the first application and the second application; and determining, by the first computing device, which application of the first application or the second application is used more by users of the group of remote computing devices.

Example 9

The method of any combination of examples 1-8, further comprising determining, by the first computing device a set of applications that are replacements for the first application by at least: determining, by the first computing device, keywords used to describe the first application in an application repository and keywords that are used to describe the second application in the application repository; and determining, by the first computing device, a number of keywords used to describe the first application that are similar to keywords used to describe the second application.

Example 10

The method of any combination of examples 1-9, wherein the keywords used to describe the first application and the keywords used to describe the second application are respectively located in a description of the first application and a description of the second application.

Example 11

A first computing device comprising: at least one processor; and a memory comprising instructions that, when executed by the at least one processor, cause the at least one processor to: receive, from a second computing device, an indication of user interaction with a first application; determine, based on the user interaction with the first application, a user engagement score associated with the first application, the user engagement score indicating at least one of how frequently or how long the user uses the first application; responsive to determining that the user engagement score does not satisfy a threshold user engagement score, determine, from a set of applications that are alternatives to the first application, a second application to substitute for the first application; and send, to the second computing device, for display, an indication of the second application.

Example 12

The first computing device of example 11, wherein the memory comprises additional instructions that, when executed by the at least one processor, cause the at least one processor to send the indication of the second application by at least sending the indication to the second computing device for display as part of an application repository graphical user interface.

Example 13

The first computing device of example 12, wherein the memory comprises additional instructions that, when executed by the at least one processor, cause the at least one processor to: send, to the second computing device, for display as part of the application repository graphical user interface, an indication of a details page associated with the first application, wherein the indication of user interaction indicates a user input to leave the details page without installing the first application, and wherein the memory comprises additional instructions that, when executed by the at least one processor, cause the at least one processor to determine the user engagement score by at least, responsive to receiving the indication of user input to leave the details page without installing the first application, reducing the user engagement score towards a minimum score.

Example 14

The first computing device of any combination of examples 11-13, wherein the memory comprises additional instructions that, when executed by the at least one processor, cause the at least one processor to send the indication of the second application by at least sending the indication to the second computing device for display as a notification.

Example 15

The first computing device of any combination of examples 11-14, wherein the memory comprises additional instructions that, when executed by the at least one processor, cause the at least one processor to send the indication of user interaction indicates a user input the second application responsive to uninstalling, by the second computing device, the first application, and wherein the memory comprises additional instructions that, when executed by the at least one processor, cause the at least one processor to determine the user engagement score by at least, responsive to receiving the indication of user input to uninstall the first application, reducing the user engagement score towards a minimum score.

Example 16

The first computing device of any combination of examples 11-15, wherein the memory comprises additional instructions that, when executed by the at least one processor, cause the at least one processor to determine the second application by at least causing the at least one processor to: determine, based on aggregate user interactions with each respective application in the set of applications that are alternatives to the first application, a respective group engagement score associated with each application in the set of applications, wherein the aggregate user interactions are associated with a group of remote computing devices; and determine, based on the respective group engagement scores, a highest ranked application in the set of applications as the second application.

Example 17

The first computing device of any combination of examples 11-16, wherein the memory comprises additional instructions that, when executed by the at least one processor, cause the at least one processor to determine the respective group engagement scores associated with each application in the set of applications by at least causing the at least one processor to: determine a number of times the group of remote computing devices displays a details page associated with the first application and installs the second application without installing the first application, or determine a number of times the group of remote computing devices uninstalls the first application and installs the second application.

Example 18

The first computing device of any combination of examples 1-17, wherein the memory comprises additional instructions that, when executed by the at least one processor, cause the at least one processor to determine the respective group engagement scores associated with each application in the set of applications by at least causing the at least one processor to: determine a plurality of computing devices that include the first application and the second application; and determine which application of the first application or the second application is used more by users of the remote computing devices.

Example 19

The first computing device of any combination of examples 11-18, wherein the memory comprises additional instructions that, when executed by the at least one processor, cause the at least one processor to determine a set of applications that are replacements for the first application by at least: determining keywords used to describe the first application in an application repository and keywords that are used to describe the second application in the application repository; and determining a number of keywords used to describe the first application that are similar to keywords used to describe the second application.

Example 20

A computer-readable storage medium encoded with instructions that, when executed by at least one processor of a computing device, cause the at least one processor to: receive an indication of user interaction with a first application installed at a memory of the computing device; determine, based on the user interaction with the first application, a user engagement score associated with the first application, the user engagement score indicating at least one of how frequently or how long the user uses the first application; responsive to determining that the user engagement score does not satisfy a threshold user engagement score, determine, from a set of applications that are alternatives to the first application, a second application to substitute for the first application; and output, for display at a display device, a graphical user interface indicative of the second application.

Example 21

A system comprising means for performing any of the methods of examples 1-10.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:
1. A method comprising:
receiving, by a first computing device and from a second computing device, an indication of a duration of user interaction with a first application cumulated over a particular amount of time and an indication of a duration of user interaction with a second application cumulated over the particular amount of time;
assigning, by the first computing device, based on the duration of user interaction with the first application and a type of the first application, a user engagement score associated with the first application;
assigning, by the first computing device, based on the duration of user interaction with the second application and a type of the second application, a user engagement score associated with the second application, wherein:

the duration of user interaction with the first application is approximately equal to the duration of user interaction with the second application, the type of the first application is different than the type of the second application, and the user engagement score associated with the first application is different than the user engagement score associated with the second application;

determining, by the first computing device, whether the user engagement score associated with the first application satisfies a threshold user engagement score;

responsive to determining that the user engagement score associated with the first application does not satisfy the threshold user engagement score:

determining, by the first computing device, at least one alternative application that users of a group of other computing devices use more than the first application, wherein the at least one alternative application is:

one of a group of alternative applications for the first application; and determined based at least in part on a comparison between aggregated user interactions with the first application relative to aggregated user interactions with the at least one alternative application from the group of alternative applications; and selecting, by the first computing device and from the at least one alternative application, a third application to substitute for the first application;

receiving, by the first computing device and from the second computing device, an indication of user input to uninstall the first application;

sending, by the first computing device and to the second computing device, for installation, the third application; and responsive to determining that the user engagement score associated with the second application satisfies the threshold user engagement score, refraining from recommending replacement applications for the second application.

2. The method of claim 1, further comprising sending, by the first computing device and to the second computing device, for display as part of an application repository graphical user interface, an indication of the third application.

3. The method of claim 1, further comprising sending, by the first computing device and to the second computing device, for display as a notification, an indication of the third application.

4. The method of claim 1, wherein determining the at least one alternative application that users of the group of other computing devices use more than the first application comprises:

determining, by the first computing device and based on the comparison of the aggregated user interactions with the first application relative to the aggregated user interactions with the one or more respective alternative applications in the group of alternative applications, a respective group engagement score associated with each application in the group of alternative applications, wherein the aggregate user interactions are associated with a group of other computing devices, wherein selecting the third application comprises assigning, based on the respective group engagement score, a highest ranked application of the at least one alternative application as the third application.

5. The method of claim 1, further comprising determining, by the first computing device, the group of alternative applications by at least:

determining, by the first computing device, keywords used to describe the first application in an application repository and keywords that are used to describe the third application in the application repository;

determining, by the first computing device, a number of keywords used to describe the first application that are similar to keywords used to describe the third application; and determining, by the first computing device, the third application is included in the group of alternative applications in response to determining the quantity of keywords used to describe the first application that are similar to keywords used to describe the third application is greater than a threshold quantity of keywords.

6. The method of claim 5, wherein the keywords used to describe the first application and the keywords used to describe the third application are respectively located in a description of the first application and a description of the third application.

7. A first computing device comprising:

at least one processor; and a memory comprising instructions that, when executed by the at least one processor, cause the at least one processor to:

receive, from a second computing device, an indication of a duration of user interaction with a first application cumulated over a particular amount of time and an indication of a duration of user interaction with a second application cumulated over the particular amount of time;

assign, based on the duration of user interaction with the first application and a type of the first application, a user engagement score associated with the first application;

assign, based on the duration of user interaction with the second application and a type of the second application, a user engagement score associated with the second application, wherein:

the duration of user interaction with the first application is approximately equal to the duration of user interaction with the second application, the type of the first application is different than the type of the second application, and the user engagement score associated with the first application is different than the user engagement score associated with the second application;

determine whether the user engagement score associated with the first application satisfies a threshold user engagement score;

responsive to determining that the user engagement score associated with the first application does not satisfy the threshold user engagement score:

determine at least one alternative application that users of a group of other computing devices use more than the first application, wherein the at least one alternative application is:

one of a group of alternative applications for the first application; and determined based at least in part on a comparison between aggregated user interactions with the first application relative to aggregated user interactions with the at least one alternative application from the group of alternative applications; and select, from the at least one alternative application, a third application to substitute for the first application; and receive, from the second computing device, an indication of user input to uninstall the first application;

send, to the second computing device, for installation, the third application; and responsive to determining that the user engagement score associated with the second application satisfies the threshold user engagement score, refrain from recommending replacement applications for the second application.

8. The first computing device of claim 7, wherein the memory comprises additional instructions that, when executed by the at least one processor, cause the at least one processor to send an indication of the third application to the second computing device for display as part of an application repository graphical user interface.

9. The first computing device of claim 7, wherein the memory comprises additional instructions that, when executed by the at least one processor, cause the at least one processor to send an indication of the third application to the second computing device for display as a notification.

10. The first computing device of claim 7, wherein the memory comprises additional instructions that, when executed by the at least one processor, cause the at least one processor to determine the at least one alternative application that users of a group of remote computing devices use more than the first application by at least causing the at least one processor to:

determine, based on the comparison of the aggregated user interactions with the first application relative to the aggregated user interactions with the one or more respective alternative applications in the group of alternative applications, a respective group engagement score associated with each application in the group of alternative applications, wherein the aggregate user interactions are associated with a group of remote computing devices; and assign, based on the respective group engagement score, a highest ranked application of the at least one alternative application as the third application.

11. The first computing device of claim 7, wherein the memory comprises additional instructions that, when executed by the at least one processor, cause the at least one processor to determine the group of alternative applications by at least causing the at least one processor to:

determine keywords used to describe the first application in an application repository and keywords that are used to describe the third application in the application repository;

determine a quantity of keywords used to describe the first application that are similar to keywords used to describe the third application; and determine the third application is included in the group of alternative applications in response to determining the quantity of keywords used to describe the first application that are similar to keywords used to describe the third application is greater than a threshold quantity of keywords.

12. A non-transitory computer-readable storage medium encoded with instructions that, when executed by at least one processor of a computing device, cause the at least one processor to:

receive an indication of a duration of user interaction with a first application cumulated over a particular amount of time and an indication of a duration of user interaction with a second application cumulated over the particular amount of time, wherein the first application and the second application are installed at a memory of the computing device;

assign, based on the duration of user interaction with the first application and a type of the first application, a user engagement score associated with the first application;

assign, based on the duration of user interaction with the second application and a type of the second application, a user engagement score associated with the second application, wherein:

the duration of user interaction with the first application is approximately equal to the duration of user interaction with the second application, the type of the first application is different than the type of the second application, and the user engagement score associated with the first application is different than the user engagement score associated with the second application;

determine whether the user engagement score associated the first application satisfies a threshold user engagement score;

responsive to determining that the user engagement score associated with the first application does not satisfy the threshold user engagement score:

determine at least one alternative application that users of a group of other computing devices use more than the first application, wherein the at least one alternative application is:

one of a group of alternative applications for the first application; and determined based at least in part on a comparison between aggregated user interactions with the first application relative to aggregated user interactions with the at least one alternative application from the group of alternative applications; and select, from the at least one alternative application, a third application to substitute for the first application; and uninstall the first application;

install the third application; and responsive to determining that the user engagement score associated with the second application satisfies the threshold user engagement score, refrain from recommending replacement applications for the second application.

13. The non-transitory computer-readable storage medium of claim 12, wherein execution of the instructions cause the at least one processor to determine the at least one alternative application that users of a group of remote computing devices use more than the first application by at least causing the at least one processor to:

determine, based on the comparison of the aggregated user interactions with the first application relative to the aggregated user interactions with the one or more respective alternative applications in the group of alternative applications, a respective group engagement score associated with each application in the group of alternative applications, wherein the aggregate user interactions are associated with a group of other computing devices; and assign, based on the respective group engagement score, a highest ranked application in the group of alternative applications as the third application.

14. The non-transitory computer-readable storage medium of claim 12, wherein execution of the instructions cause the at least one processor to send an indication of the third application to a second computing device for display as part of an application repository graphical user interface.

15. The non-transitory computer-readable storage medium of claim 12, wherein execution of the instructions cause the at least one processor to determine the group of alternative applications by at least causing the at least one processor to:
- determine keywords used to describe the first application in an application repository and keywords that are used to describe the third application in the application repository;
- determine a quantity of keywords used to describe the first application that are similar to keywords used to describe the third application; and
- determine the second application is included in the group of alternative applications in response to determining the quantity of keywords used to describe the first application that are similar to keywords used to describe the third application is greater than a threshold quantity of keywords.

\* \* \* \* \*